United States Patent
Larsson et al.

(10) Patent No.: US 11,280,583 B2
(45) Date of Patent: Mar. 22, 2022

(54) REFLEX SIGHT

(71) Applicant: AIMPOINT AB, Malmo (SE)

(72) Inventors: Niklas Larsson, Akarp (SE); John Ortengren, Lund (SE); Olof Martinsson, Malmo (SE)

(73) Assignee: AIMPOINT AB, Malmo (SE)

( * ) Notice: Subject to any disclaimer, the term of this patent is extended or adjusted under 35 U.S.C. 154(b) by 0 days.

(21) Appl. No.: 16/292,567

(22) Filed: Mar. 5, 2019

(65) Prior Publication Data

US 2019/0277600 A1 Sep. 12, 2019

(30) Foreign Application Priority Data

Mar. 7, 2018 (SE) .................................. 1850250-0

(51) Int. Cl.
*G02B 23/00* (2006.01)
*F41G 1/30* (2006.01)
*F41G 1/34* (2006.01)

(52) U.S. Cl.
CPC .............. *F41G 1/30* (2013.01); *F41G 1/345* (2013.01); *G02B 23/00* (2013.01)

(58) Field of Classification Search
CPC . G02B 7/00; G02B 7/02; G02B 7/022; G02B 7/023; G02B 7/18; G02B 7/1822; G02B 23/00; G02B 23/16; F41G 1/30; F41G 1/345
USPC .................................. 359/694, 703, 399–435
See application file for complete search history.

(56) References Cited

U.S. PATENT DOCUMENTS

| | | | |
|---|---|---|---|
| 3,942,901 A | 3/1976 | Ekstrand | |
| 4,859,058 A | 8/1989 | Ekstrand | |
| 4,945,646 A * | 8/1990 | Ekstrand | F41G 1/30 356/252 |
| 5,189,555 A | 2/1993 | Jorlov | |
| 5,452,131 A | 9/1995 | Jorlov | |
| 5,463,495 A * | 10/1995 | Murg | F41G 1/38 359/399 |
| 5,508,843 A * | 4/1996 | Tomita | F41G 1/38 356/252 |

(Continued)

FOREIGN PATENT DOCUMENTS

| | | |
|---|---|---|
| EP | 2075524 A2 | 7/2009 |
| FR | 2223715 A1 | 10/1974 |

(Continued)

OTHER PUBLICATIONS

Extended European Search Report in corresponding/related European Application No. 19 161 398.3 dated Jun. 4, 2019.

(Continued)

*Primary Examiner* — Thong Q Nguyen
(74) *Attorney, Agent, or Firm* — Patent Portfolio Builders PLLC

(57) ABSTRACT

A reflex sight includes an elongated sight housing having an outer tube and an inner tube defining a light channel with an optical axis, wherein the inner tube is pivotally secured within an end of the outer tube and has an end section forming an outer perimeter section, which is provided with separate convex sections. The separate convex sections of the inner tube are arranged to fit into the separate concave support sections in the outer tube, wherein the end section of the inner tube is pivotally received within the end section of the outer tube.

20 Claims, 2 Drawing Sheets

(56) References Cited

U.S. PATENT DOCUMENTS

| | | | |
|---|---|---|---|
| 5,531,040 A * | 7/1996 | Moore | F41G 1/35 |
| | | | 362/114 |
| 6,469,829 B2 * | 10/2002 | Otteman | G02B 7/027 |
| | | | 359/399 |
| 7,872,747 B2 * | 1/2011 | Gerlach | F41G 1/30 |
| | | | 356/251 |
| 7,990,523 B2 * | 8/2011 | Schlierbach | F41G 3/326 |
| | | | 356/5.01 |
| 2004/0047586 A1 | 3/2004 | Schick et al. | |
| 2016/0377378 A1 | 12/2016 | Collin | |
| 2018/0024376 A1 * | 1/2018 | Dohr | F41G 3/06 |
| | | | 345/7 |

FOREIGN PATENT DOCUMENTS

| | | |
|---|---|---|
| WO | 9813717 A2 | 4/1998 |
| WO | 2011123035 A1 | 10/2011 |

OTHER PUBLICATIONS

Office Action in corresponding/related Swedish Application No. 1850250-0 dated Oct. 3, 2018.

\* cited by examiner

REFLEX SIGHT

TECHNICAL FIELD

The present disclosure relates to a reflex sight with an elongated sight housing, and more particularly to a reflex sight comprising an outer tube and an inner tube, wherein the inner tube is pivotally secured with the outer tube.

BACKGROUND

Reflex sights also known as red dot sights are popular sights both for civilian users such as hunters and sportsmen but also for professional users such as police and military. The reflex sight has a number of advantages over a traditional iron sight as well as a magnifying telescope sight. A user of the reflex sight may have both eyes open, i.e. one eye looking through the sight for aiming at a target and the other eye may look at the environment surrounding the target. Thereby, the user may focus on the target and fire faster than with traditional iron sights or optical magnifying telescope sights. Additionally, the reflex sight has an unlimited eye relief and the user of the reflex sight may not only find the target fast but also shoot with both eyes open.

Due to the advantageous features, reflex sights are commonly used on shotguns, automatic and semi-automatic rifles, and small firearms, such as handguns.

A number of conventional prior art reflex sights have a cylindrical shape with a circular cross section. US2004/0047586 discloses a reflex sighting device with an elongated housing assembly. The housing assembly includes a cylindrical main housing having an outer housing cylinder connected thereto by a threaded sleeve portion threadably secured in a threaded bore portion at the outer end of the main housing. An inner sighting cylinder is pivotally secured within the main housing and the outer housing cylinder.

In order to take aim fast it is important for the user to be able to view as much as possible of the target and the surrounding environment. Hence, a wide field of view through the sight is desirable. On the other hand, small dimensioned sights are desired to be used in combination with small firearms, such as handguns. The size of the sectional area of the sight restricts the field of view through the sight. However, the cylindrical shape of the sight restricts the ability to make the sight smaller in size, without reducing the field of view through the sight.

WO9813717 discloses an electro-optical sighting device for a handgun comprising a square-shaped thick meniscus optical element of transparent material having a front surface for facing the target and a back surface in which the user views an image of the target. A source of light is directed at and reflected back from the back surface of the lens, forming a light channel in the open air, to create a sighting image for the user to align with the image of the target as viewed in the optical element.

Without a housing covering the light channel from the source of light to the optical element or lens, dirt, water, and snow may block the light path between the light source and the lens of the sighting device. This kind of sight is also more sensitive to shocks and impacts. Other drawbacks with this solution is that the parallax is worse and it is more difficult to find the point of aim without a light channel of the housing.

SUMMARY

According to an embodiment, there is a reflex sight. The reflex sight includes: an elongated sight housing comprising an outer tube and an inner tube defining a light channel with an optical axis, wherein the inner tube is pivotally secured within a front end of the outer tube allowing adjustment of a longitudinal axis of the inner tube in a vertical and/or horizontal direction;

a lens with a partially reflective surface arranged in a front end of the inner tube facing an intended target;

a light source arranged in the light channel, which is adapted to emit light towards the reflective surface projecting a reticle for a user of the sight;

wherein the outer tube terminates in an end section forming an inner perimeter section of the outer tube, which is provided with concave indentations forming separated concave support sections;

the inner tube has an end section forming an outer perimeter section, which is provided with separated convex sections;

wherein the separated convex sections of the inner tube are arranged to fit into the separated concave support sections of the outer tube, wherein the end section of the inner tube is pivotally received within the end section of the outer tube.

An advantage of embodiments of the present disclosure is an improved parallax. Another advantage of embodiments of the present disclosure is that the sectional area of the light channel through the sight is enlarged without increasing the dimensions of the reflex sight.

Other aspects and features of the invention and its embodiments are defined by the appended patent claims and are further explained, together with problems solved and advantages obtained, in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof.

All terms used in the claims are to be interpreted according to their ordinary meaning in the technical field, unless explicitly defined otherwise herein. All references to "a/an/the element, device, component, means, etc are to be interpreted openly as referring to at least one instance of the element, device, component, means, etc., unless explicitly stated otherwise.

BRIEF DESCRIPTION OF THE DRAWINGS

Exemplary embodiments is illustrated by way of example in the accompanying drawings in which like reference numbers indicate the same or similar elements and in which.

DESCRIPTION OF EMBODIMENTS

Embodiments of the invention will be described with reference to FIGS. 1-3. In cooperation with attached drawings, the technical contents and detailed description of the present invention are described thereinafter according to a preferable embodiment, being not used to limit its executing scope. Any equivalent variation and modification made according to appended claims are covered by the claims.

Reference will now be made to the figures to describe the embodiments in detail. The same reference signs are used for corresponding features in different figures.

Figure 1:
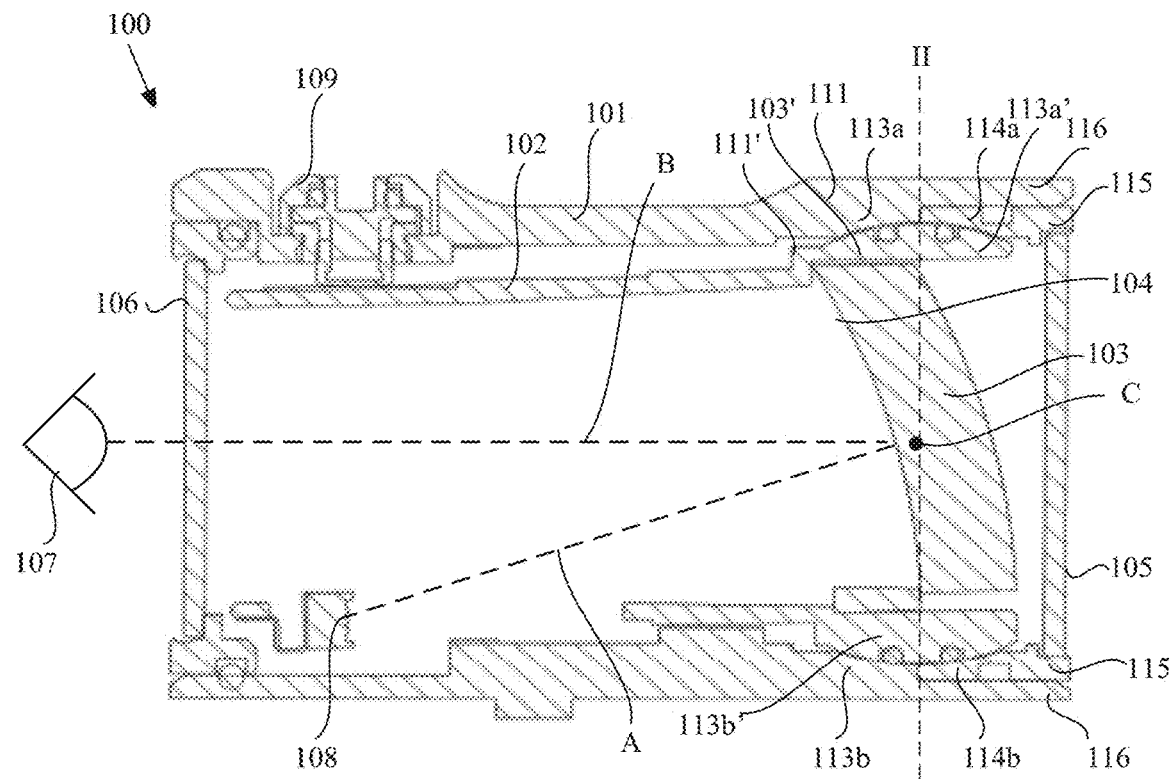
FIG. 1 is a plan cross-sectional view showing a reflex sight according to a first embodiment.

Reference is made to FIG. 1, which is a plan cross-sectional view showing an exemplary embodiment of a reflex sight 100 adapted to be firmly attached to a firearm, including but not limited to a rifle, shotgun, automatic and semi-automatic rifles, and small firearms, such as handguns by means of a mount (not shown) or bracket. The reflex sight 100 comprises a longitudinal sight housing forming a longitudinal outer tube 101 having an essentially square-shaped cross-section and a longitudinal inner tube 102 having an essentially square-shaped cross-section, wherein the inner tube 102 is pivotally secured within the front end of the outer tube 101.

A square-shaped lens 103 with an inner partially reflective surface 104 is arranged in a mating square-shaped support section 103' in a front end of the inner tube 102 intended to face a target (not shown). A front glass 105 may be arranged in the front end of the outer tube 101 for protecting the lens from dirt, moisture, snow, fingerprints etc and from being scratched. A viewing glass plate 106 is supported at the rear end of the sight housing 101 facing an eye 107 of a shooter.

A battery powered light source 108 is arranged in a light channel inside the inner tube 102 to project a beam of light through a path, indicated by a dashed line A, angled in a direction to the reflective surface 104 of the lens 103. The light beam is reflected by the reflective surface 104 along an optical axis of the light channel, indicated by a dashed line B, through the glass plate 106 to the eye 107 of the shooter. Thereby, the inner tube 102 forms a light channel with a square-shaped cross-section. Hence, when the shooter looks at the target through the light channel from this rear end, the shooter sees a dot as a reticle, which may be put on the spot on the target for the desired point of impact.

The light source 108 may be, but is not limited to, a Light Emitting Diode, LED, having a diameter of 20-80 μm. The reflective surface 104 of the lens 103 may be a Mangin mirror. In such an arrangement the Mangin mirror may be evaporated on a conventional lens. Further, the light source may be configured to emit light to provide a reticle in other shapes, such as an illuminated cross hair or any other suitable shape.

The inner tube 102 is movably biased by elevation adjustment means 109 at the inside of the rear end of the sight housing 101 allowing adjustment of the longitudinal axis of the inner tube 102 in a vertical direction in relation to the longitudinal axis of the sight housing 101 in order to calibrate the sight to a particular firearm. A corresponding horizontal adjustment means (not shown) is also provided, making the inner tube 102 movably biased allowing adjustment of the longitudinal axis of the inner tube 102 in a horizontal direction in relation to the longitudinal axis of the sight housing 101. Thereby, the reflex sight 100 may be calibrated relative to the trajectory of the bullet to compensate for both elevation and windage.

Figure 2:
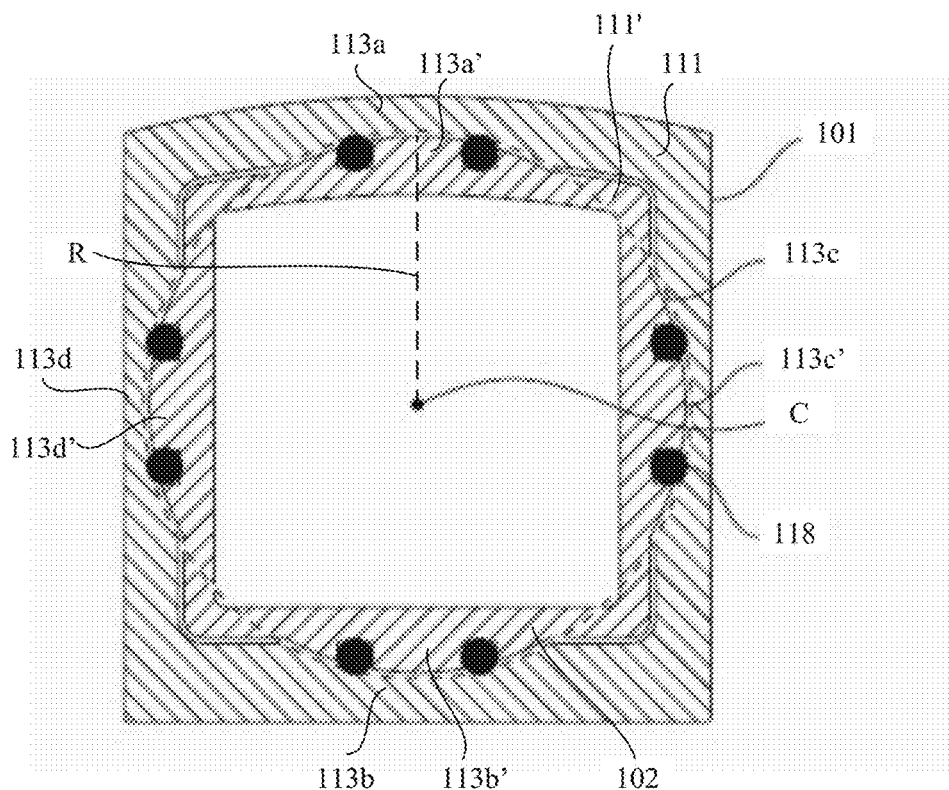
FIG. 2 is a front cross-sectional view of the reflex sight along the line II-II in FIG. 1.

The inner front end of the outer tube 101 terminates in a square-shaped end section 111 forming an inner perimeter section of the outer tube 101, which is provided with concave indentations forming separate support sections 113a, 113b, 113c, 113d in the inner perimeter of the outer tube 101 as shown in FIG. 2.

In this embodiment the support sections 113a, 113b, 113c, 113d are in the shape of portions of spherical caps, and similar support sections 114a, 114b, 114c, 114d also in the shape of portions of spherical caps are provided as indentations on each side of an inner perimeter of a separate square-shaped retaining end frame 115. The inner tube 102 is secured in the outer tube 101 by means of the end frame 115 inserted in the front end of the outer tube 101. In this embodiment the front glass 105 may be arranged in the end frame 115.

In another embodiment, the support sections 113a, 113b, 113c, 113d are in the shape of spherical caps and the end frame 115 is not necessary.

The inner tube 102 also has a square-shaped end section 111' forming an outer perimeter section. The outer perimeter section of the inner tube 102 is provided with separate convex sections 113a', 113b', 113c', 113d' on each side of the outer perimeter section. In this embodiment the separate convex sections 113a', 113b', 113c', 113d' are in a shape of, but is not limited to, convex spherical caps. In other embodiments the separate convex sections may be in a shape of at least portions of spherical caps.

The concave spherical cap shaped support sections 113a, 113b, 113c, 113d; 114a, 114b, 114c, 114d, and the corresponding convex spherical cap shaped sections 113a', 113b', 113c', 113d', have essentially the same radius, which is indicated as a dashed line R in FIG. 2, and a common center point C. Thereby, the concave and the convex spherical cap shaped support sections form a common sphere. Hence, at least a number of parts of the inner tube 102 corresponding to the number of convex spherical cap shaped sections 113a', 113b', 113c', 113d' of the inner tube 102 extend beyond the radius R of the separate convex sections 113a', 113b', 113c', 113d' in the cross section of the inner tube perpendicular to the optical axis at the center point C.

Hence, the convex spherical cap shaped sections 113a', 113b', 113c', 113d' are arranged to fit into the support sections 113a, 113b, 113c, 113d in the outer tube 101 and the support sections 114a, 114b, 114c, 114d in the end frame 115. Thereby, the square-shaped end section 111' of the inner tube 102 is matably and pivotally received within the square end section 111 of the outer tube 101.

The end frame 115 is inserted into a mating bore 116 in the front end of the outer tube 101 of the sight housing to secure the end section 111'. Thereby, the inner tube 102 is held axially in place while permitting pivotal movement of the inner tube 102.

Figure 3:
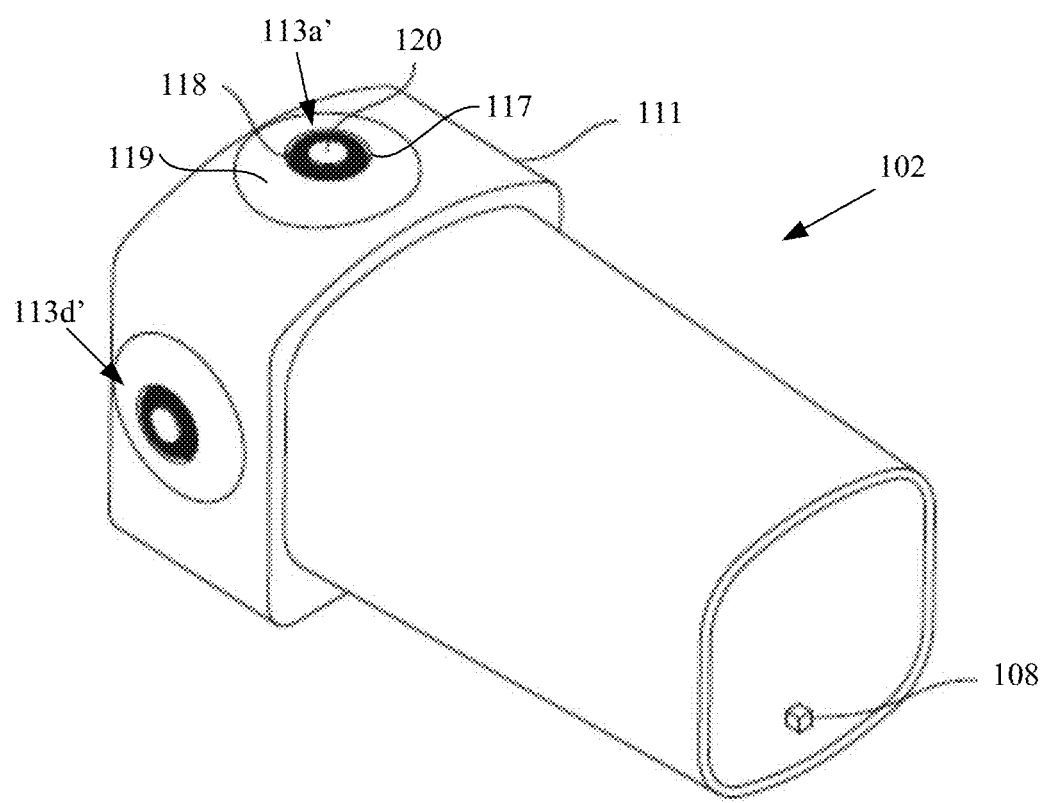
FIG. 3 is a pictorial view of an inner tube of the reflex sight in FIGS. 1 and 2.

In this embodiment, each of the convex spherical cap shaped sections 113a', 113b', 113c', 113d' may have a recess 117 holding damping means, in this embodiment an elastic ring 118, for example an o-ring made of synthetic or natural rubber, or any suitable elastomer as illustrated in FIG. 3. The recess 117 may form two circumferential spherical segments 119 and 120. The elastic ring 118 in each recess 117 improves the engagement between the inner tube 102 and the outer tube 103.

When the reflex sight 100 is mounted on a firearm, the user then will view the target or object in the scene through the viewing glass plate 106, the light channel through the inner tube 102, the lens 103 and the protecting front glass plate 105. In order to assist in aiming, the red dot emitted from the light source 108 is projected onto the reflective surface 104 of the lens 103 and is reflected back to the eye 107 of the shooter through the glass plate 106. The elevation and horizontal adjustment means are arranged to calibrate the reflex sight 100 relative to the trajectory of the bullet to compensate for windage and elevation. In the embodiment describe with reference to FIGS. 1-3 the inner tube 102 is selectively movable relative to the outer tube 101 by means of the adjustment means.

When the firearm is fired the recoil forces the inner tube to move forward in relation to the outer tube 101. The elastic rings 118 force the inner tube to return to its initial position in relation to the outer tube 101 as before the firearm was fired. Thereby, the reflex sight 100 will maintain its calibration.

The overall sight assembly is thereby advantageously resistant to recoil and shock, and prevents dirt, moisture etc to leak into the interior of the reflex sight 100.

Embodiments of the present invention have been described herein with reference to a reflex sight 100, which comprises a sight housing forming a longitudinal outer tube having an essentially square-shaped cross-section and a longitudinal inner tube having an essentially square-shaped cross-section, which is pivotally secured within the front end of the outer tube. It will be understood that the sight housing, outer tube and the inner tube may have other shapes than an essentially square-shaped cross-section in other embodiments, for example, triangular, rectangular, pentagonal, hexagonal, etc without departing from the scope of the claims. As shown in the embodiment in FIGS. 2-3, the upper side of the end section 111 of the outer tube 101 is slightly curved. Hence, one or more of the sides of the outer tube may be slightly curved in other embodiments of the reflex sight 100 without departing from the scope of the claims. The contour of the inner tube and the outer tube may be provided with rounded-out corners or sharp corners.

The invention is not limited to that the inner tube is pivotally secured within the front end of the outer tube. In other embodiments, the inner tube may be pivotally secured to the back end of the outer tube, without departing from the claimed invention.

In another embodiment, the inner front end of the outer tube terminates in a end section forming an inner perimeter section of the outer tube, which is provided with concave indentations forming at least two separate and opposite support sections in the inner perimeter of the outer tube.

In other embodiments, the concave spherical cap shaped sections 113a, 113b, 113c, 113d has a recess holding the damping means.

In other embodiments, the end section 111 of the outer tube 101 is a separate section fixed to the outer tube 101. The separate section may e.g. be a piece of plastic which is inserted into and firmly attached to the outer tube 101, thereby forming the inner perimeter section of the outer tube 101.

The features and advantages of the invention are apparent from the detailed specification, and thus it is intended by the appended claims to cover all such features and advantages of the invention, which fall within the scope of the technology. For example, the light source may be a Light Emitting Diode, LED, or a resonant cavity light emitting diode, RCLED, generating red light. However, other light sources generating red light or any other suitable colour, for example, green, blue, yellow, may be used.

In another embodiment a recess may be provided around the circumference of the front end section of the inner tube 102 and an elastic ring may be arranged in the recess extending around the inner tube 102 for improving the engagement between the inner tube 102 and the outer tube 101.

In still another embodiment, the damping means may comprise at least one spring arranged in the one or more recesses in the inner tube 102 to bias the inner tube 102 in relation to the outer tube 101, thereby improving the engagement between the inner tube 102 and the outer tube 101. Hence, when the firearm is fired the recoil forces the inner tube 102 to move forward in relation to the outer tube 101. The springs force the inner tube to return to its initial position in relation to the outer tube 101 as before the firearm was fired. Thereby, the reflex sight 100 will maintain its calibration.

Other configurations are possible within the scope of the present patent claims. However, although embodiments of the reflex sight 100 has been illustrated in the accompanying drawings and described in the foregoing detailed description, the disclosure is illustrative only, and changes, modifications and substitutions may be made without departing from the scope of the technology as set forth and defined by the following claims. Hence, it should be understood that the limitations of the described embodiments are merely for illustrative purpose and by no means limiting. Instead, the scope of the technology is defined by the appended claims rather than by the description, and all variations that fall within the range of the claims are intended to be embraced therein.

In some embodiments, the separated concave support sections may form at least portions of spherical caps in the inner perimeter section of the outer tube; and the separated convex sections may form at least portions of spherical caps on the outer perimeter section of the inner tube.

In some embodiments, the reflex sight may comprise an end frame inserted in the front end of the outer tube, wherein said end frame is provided with concave indentations forming separated concave support sections, wherein the separated convex sections are arranged to fit into the concave support sections in the outer tube and the concave support sections in the end frame, thereby, the end section of the inner tube is pivotally received within the end section of the outer tube with the frame.

In some embodiments, the concave support sections in the end frame form at least portions of spherical caps.

In some embodiments, the spherical cap shaped support sections of the outer tube, and the corresponding convex spherical cap shaped sections of the inner tube have essentially the same radius, and a common center point.

Advantageously, at least a number of parts of the inner tube corresponding to the number of convex spherical cap shaped sections of the inner tube extend beyond a radius of the separated convex sections in the cross section of the inner tube perpendicular to the optical axis at the center point.

In some embodiments, the sight housing forms a longitudinal essentially square-shaped outer tube and a longitudinal essentially square-shaped inner tube.

In some embodiments, the sight housing forms a longitudinal outer tube and a longitudinal inner tube, having a triangular, rectangular, pentagonal, or hexagonal cross sectional shape.

In some embodiments, damping means is arranged between the end section of the inner tube and the end section of the outer tube.

In some embodiments, separated damping means are provided between the separate concave support sections of the outer tube and the separated convex sections of the inner tube.

Advantageously, the damping means is an elastomer.

In some embodiments, the damping means is rubber.

In some embodiments, the damping means comprises at least one spring.

In some embodiments, the convex spherical cap shaped sections has a recess holding the damping means.

In some embodiments, each of the concave spherical cap shaped sections has a recess holding the damping means.

In some embodiments, each recess forms two circumferential spherical segments in the spherical cap shaped sections in the inner tube.

In some embodiments, the damping means is an o-ring.

In some embodiments, the end section of the outer tube is a separate section fixed to the outer tube, thereby forming the inner perimeter section of the outer tube.

In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A reflex sight comprising:
an elongated sight housing comprising an outer tube and an inner tube defining a light channel with an optical axis, wherein the inner tube is pivotally secured within a front end of the outer tube allowing adjustment of a longitudinal axis of the inner tube in a vertical and/or horizontal direction;
a lens with a partially reflective surface arranged in a front end of the inner tube facing an intended target;
a light source arranged in the light channel, which is adapted to emit light towards the reflective surface projecting a reticle for a user of the sight; characterized in that:
the outer tube terminates in an end section forming an inner perimeter section of the outer tube, which is provided with concave indentations forming separated concave support sections;
the inner tube has an end section forming an outer perimeter section, which is provided with separated convex sections;
wherein the separated convex sections of the inner tube are arranged to fit into the separated concave support sections of the outer tube, wherein the end section of the inner tube is pivotally received within the end section of the outer tube.

2. The reflex sight of claim 1, wherein the separated concave support sections form at least portions of spherical caps on the inner perimeter section of the outer tube; and
the separated convex sections form at least portions of spherical caps on the outer perimeter section of the inner tube.

3. The reflex sight of claim 2, wherein the spherical cap shaped support sections of the outer tube, and the corresponding convex spherical cap shaped sections of the inner tube, have essentially the same radius, and a common center point.

4. The reflex sight of claim 2, wherein portions of the inner tube between a number of convex spherical cap shaped sections of the inner tube extend beyond a radius of the separated convex sections in a section of the inner tube perpendicular to the optical axis at a center point.

5. The reflex sight of claim 2, wherein damping means is/are arranged between the end section of the inner tube and the end section of the outer tube.

6. The reflex sight of claim 5, wherein separated damping means are provided between the separated concave support sections of the outer tube and the separated convex sections of the inner tube.

7. The reflex sight of claim 6, wherein each of the convex spherical cap shaped sections has a recess holding the damping means.

8. The reflex sight of claim 7, wherein each recess forms two circumferential spherical segments in the spherical cap shaped sections in the inner tube.

9. The reflex sight of claim 6, wherein each of the concave spherical cap shaped sections has a recess holding the damping means.

10. The reflex sight of claim 9, wherein the damping means is an o-ring.

11. The reflex sight of claim 6, wherein the separated damping means is an elastomer.

12. The reflex sight of claim 11, wherein the damping means is rubber.

13. The reflex sight of claim 5, wherein the damping means is an elastomer.

14. The reflex sight of claim 13, wherein the damping means is rubber.

15. The reflex sight of claim 5, wherein the damping means comprises at least one spring.

16. The reflex sight of claim 1, comprising an end frame inserted in the front end of the outer tube, wherein said end frame is provided with concave indentations forming separated concave support sections, wherein the separated convex sections are arranged to fit into the concave support sections of the outer tube and the concave support sections in the end frame, thereby, the end section of the inner tube is pivotally received within the end section of the outer tube with the frame.

17. The reflex sight of claim 16, wherein the concave support sections of the end frame form at least portions of spherical caps.

18. The reflex sight of claim 1, wherein the outer tube is a longitudinal square-shaped outer tube,
the inner tube is a longitudinal square-shaped inner tube, and
the sight housing forms the longitudinal square-shaped outer tube and the longitudinal square-shaped inner tube.

19. The reflex sight of claim 1, wherein the outer tube is a longitudinal outer tube,
the inner tube is a longitudinal inner tube, and
the sight housing forms the longitudinal outer tube and the longitudinal inner tube, having one of a triangular, rectangular, pentagonal, or hexagonal cross sectional shape.

20. The reflex sight of claim 1, wherein the end section of the outer tube is a separated section fixed to the outer tube, thereby forming the inner perimeter section of the outer tube.

* * * * *